(12) United States Patent
Averill

(10) Patent No.: US 6,432,021 B1
(45) Date of Patent: Aug. 13, 2002

(54) THREE MODE DIFFERENTIAL

(75) Inventor: Bryan M. Averill, Portland, OR (US)

(73) Assignee: Warn Industries, Inc., Milwaukie, OR (US)

( * ) Notice: Subject to any disclaimer, the term of this patent is extended or adjusted under 35 U.S.C. 154(b) by 0 days.

(21) Appl. No.: 09/611,656

(22) Filed: Jul. 7, 2000

(51) Int. Cl.$^7$ ............................................. F16H 48/06
(52) U.S. Cl. ....................................................... 475/237
(58) Field of Search ................................. 475/231, 237

(56) References Cited

U.S. PATENT DOCUMENTS

| | | |
|---|---|---|
| 4,526,063 A | 7/1985 | Oster |
| 4,788,888 A | 12/1988 | Tsutsumikoshi |
| 4,873,892 A * | 10/1989 | Ohkubo ...................... 475/237 |

* cited by examiner

Primary Examiner—Dirk Wright

(57) ABSTRACT

A differential for a wheel set provided with three modes of operation. A stub axle and wheel axle in combination provide drive torque to one wheel of the wheel set. A single wheel axle provides torque to the other wheel of the wheel set. The stub axle and wheel axle are releasably interconnected by a clutch ring and when connected provide conventional differential operation including equalized torque applied from a propeller shaft to the wheels of the wheel set. Alternatively the clutch ring can also provide connection to the differential casing to insure common rotation of the two wheels. In the third mode, the clutch ring does not connect any of the components and the non-resisted rotation of the stub axle effectively disconnects the wheel axles from the propeller shaft. An actuator provides actuation from a position at the exterior of the differential into and through the case to the clutch ring. The actuator includes bearing type interconnections to achieve axial movement even though the components have different rates of rotation.

5 Claims, 3 Drawing Sheets

THREE MODE DIFFERENTIAL

FIELD OF THE INVENTION

This invention relates to a vehicle differential having multiple modes of operation and more particularly to a shift mechanism for shifting the differential between the different modes.

BACKGROUND OF THE INVENTION

A substantial number of vehicles are designed to have the versatility of two-wheel drive and four-wheel drive. In two-wheel drive, either the front pair of wheels or the rear pair of wheels are connected to the vehicle's power source. In four-wheel drive, both the front and rear pair of wheels are connected to the power source.

Each pair of wheels have a pair of axles connected to a differential which in turn is connected to a propeller shaft driven by the vehicle's power source. A front propeller shaft is connected to the front differential and a rear propeller shaft is connected to the rear differential. One of the propeller shafts is disconnected from the vehicle's power source for two-wheel drive.

Referring to the differential for the wheel set that can be connected and disconnected from the power source (commonly the front wheel set or front pair of wheels), the primary function of the differential is to permit the left and right wheels to rotate at different speeds. This is accomplished by a gear assembly that includes a differential case that is rotatably driven by the propeller shaft. Opposing side gears in the differential case are coupled to the axles and the opposing side gears are coupled together by pinion or spider gears commonly referred to as differential gears which are rotatably mounted to the case of the differential.

The arrangement of gears in the differential transmits torque from the propeller shaft to the axles which in turn transmits the torque to a pair of front end or rear end wheels. The torque of the axles is always equal regardless of the speed of the axles relative to each other. When the axles are connected to wheels having similar tractive capacity, the axles rotate equally or, if the vehicle is in a turn, they rotate differently according to the turning radius of each wheel. Differential axle rotation in this case is desirable for normal vehicle operation. When the axles are connected to wheels having substantially different tractive capacity, the wheel having lesser tractive capacity may slip, thus causing the axle connected to it to turn faster than the axle connected to the wheel having greater tractive capacity. Differential axle rotation in this case is undesirable for normal vehicle operation.

The above explanation explains two circumstances or modes for a differential, i.e., allowing the differential to provide differential axle rotation and preventing differential axle rotation. A third desired mode occurs when the propeller shaft for that set of wheels is disconnected from the vehicle's power source, i.e., the vehicle is placed in two-wheel drive. Once the propeller shaft is disconnected from the power source, the propeller shaft is passive (it does not convey a driving torque). However, it is still driven in that the wheels of that wheel set are forced to turn as the vehicle is driven in two-wheel drive and they drive the axles which drive the differential gears which drive the propeller shaft. In this event, it is desirable to separate or disconnect the propeller shaft from the driven axles (the third mode) to avoid unnecessary rotation of the propeller shaft and thereby save energy and wearing.

Accordingly, it is an object of the present invention to provide a shift mechanism for the differential for shifting the differential between the above-explained three modes.

BRIEF DESCRIPTION OF THE INVENTION

In a preferred embodiment of the present invention, the propeller shaft is connected to a pinion gear that drives a ring gear that is connected to a differential case. The differential case (through a cross pin and spider gears) rotates opposing side gears, one of which rotates a first wheel axle and the other a stub axle. The stub axle is adjacent a second wheel axle and a clutch ring is movable between a position of engagement with only the stub axle or a position of engagement with both the stub axle and second wheel axle.

If the stub axle is locked to the second wheel axle, the wheels are driven as is typical for a differential as explained above. If the stub axle is unlocked from the second wheel axle, the stub axle rotates freely, i.e., with very little resistance in either direction of rotation. In such case, the propeller shaft is effectively uncoupled from the wheel axles. The first wheel axle, which is connected to the differential assembly will simply drive the differential gears and stub axle (and not the differential case) and thereby allow the propeller shaft and the ring gear and pinion gears to remain idle, assuming that the propeller shaft is also disconnected from the power source.

The clutch ring has a third position of engagement whereby it not only locks the stub axle to the second wheel axle but it locks both to the differential case. If either one of the wheel axles are locked to the case, the gears of the case are locked together and prevent relative rotation. Thus, both wheel axles are locked to the differential case and differential rotation of the wheels is prevented.

The structure for achieving this three mode positioning includes a clutch ring with inner and outer teeth. The stub axle and second wheel axle are in close adjacency and have matching outer splines. The inner teeth of the clutch ring produce engagement as between the stub axle and the second wheel axle. The differential case is configured to have a ring-shaped or flange portion with inner splines in close proximity to the juncture of the stub axle and second wheel axle. These inner splines of the case are matched to the outer splines of the clutch ring for engagement therebetween. In the desired arrangement, the clutch ring can be moved first into engagement with both axle portions and then, as desired, into engagement also with the inner splines of the differential case.

An actuator for actuating movement of the clutch ring includes an inner shift spring assembly connected to posts that extend axially through the differential case to position outside the case and connect to an outer shift ring. The shift ring, shift ring assembly and shift posts rotate with the case but have limited axial movement relative to the case. A shift shaft is coupled to the outer shift ring outside the differential case. The clutch ring is coupled to the inner shift spring assembly and posts at a position inside the differential case.

The shift shaft protrudes through the differential carrier where a power source produces the desired linear shifting movement of the shift shaft. The shift shaft does not rotate with the shift ring and thus the coupling to the outer shift ring includes a shift fork including bearing members that allow relative rotation as between the outer shift ring and shift fork but not axial/linear movement. This linear movement of the shift shaft produces linear movement of the shift fork and thus linear movement of the outer shift ring and posts. The clutch ring is rotatably fixed to the stub axle and in two of the three modes has to be capable of rotative motion relative to the differential case and thus the outer shift ring and posts. Thus, the coupling as between the posts and clutch ring includes bearing members (provided by the shift spring assembly) that allows relative rotation as between the posts/shift ring. Thus, linear movement of the shift rings (induced by the shift shaft) induces similar linear movement of the clutch ring.

The clutch ring movement is not always subject to instant selective movement and thus the coupling between the posts/shift ring and clutch ring is accomplished by compliant members of the spring assembly which urge the clutch ring into engagement. In the event the splines of the components to be engaged are not in alignment, the clutch ring is thus spring loaded toward engagement and achieves engagement when the splines become aligned. It can also happen that the splines become torque locked when disengagement is attempted and the compliant springs will similarly become spring locked until torque lock up is released.

The features as described above will be more fully understood and appreciated upon reference to the following detailed description and the accompanying drawings referred to therein.

DESCRIPTION OF THE PREFERRED EMBODIMENT

Figure 1:
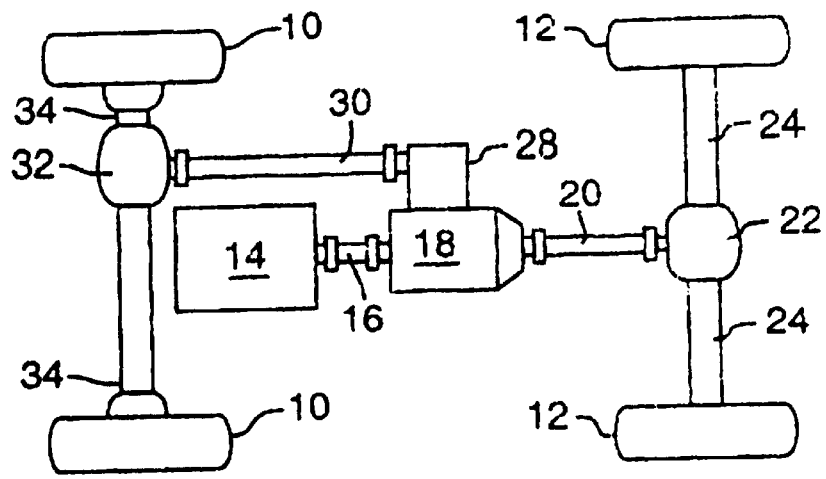
FIG. 1 is a schematic view of a vehicle chassis illustrating an arrangement of a drive train including a differential as may incorporate the present invention.
Figure 3:
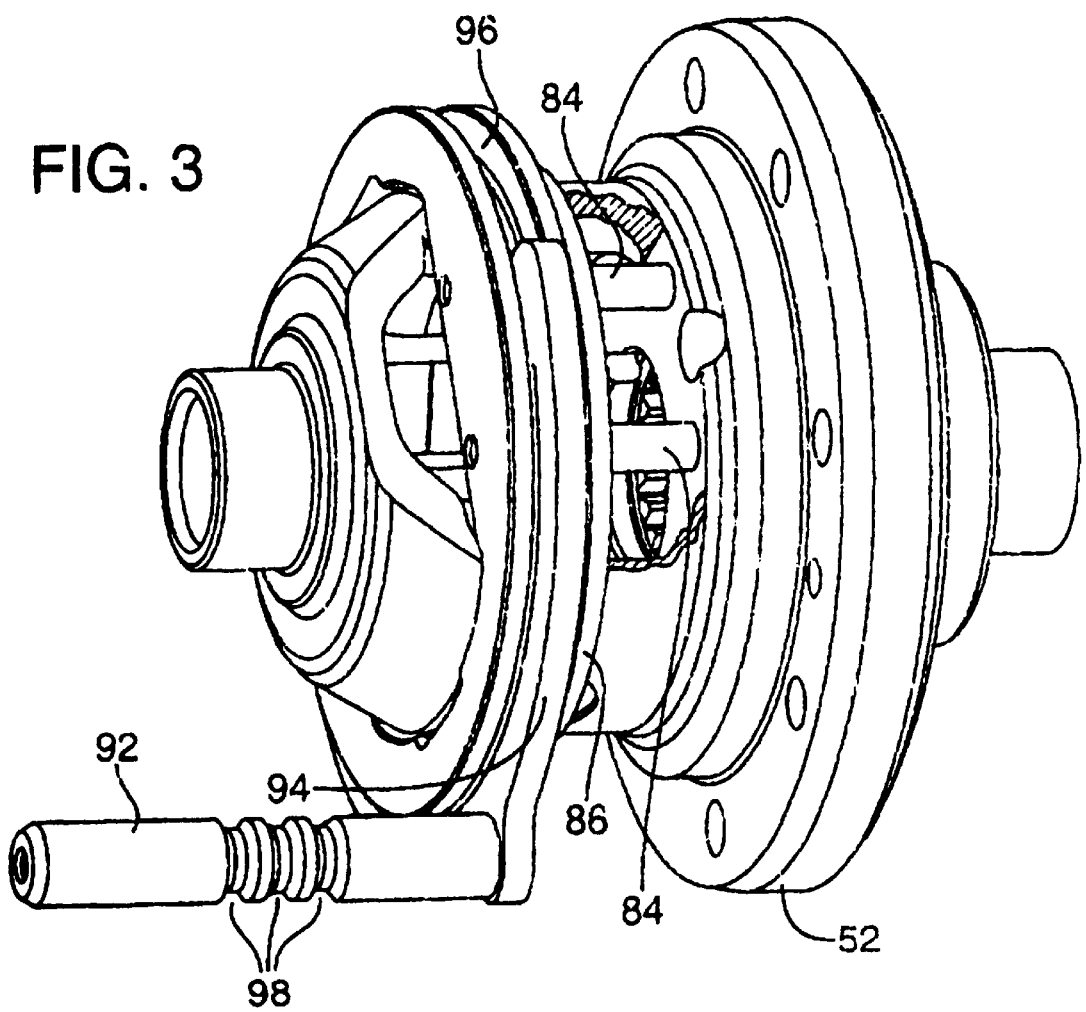
FIG. 3 is a perspective view of the differential of FIG. 2 excluding the carrier portion.

Reference is made to FIG. 1 which substantially illustrates a drive train of a vehicle. Illustrated are front wheels 10 and rear wheels 12. An engine 14 drives a drive shaft 16 connected to a transmission 18. The transmission drives a rear wheel propeller shaft 20 connected to a rear wheel differential 22 that drives rear wheel axle 24 which in turn drives the rear wheels 12. A drive connection from the transmission to a transfer case 28 drives a front wheel propeller shaft 30 connected to a front wheel differential 32. The front wheel differential is connected to front axles 34 which drive the front wheels 10.

As illustrated, the shift mechanism for shifting into and out of four-wheel drive occurs at the transfer case 28 and places front wheel propeller shaft 30 into and out of engagement with the transmission 18 and thus the drive shaft 16 of the engine 14. The invention is accordingly incorporated into the front differential 32 although it will be understood that the drive train can be arranged to provide the shift mechanism to engage and disengage rear wheel propeller shaft 20 in which case the invention would be incorporated into rear differential 22. Hereafter whereas the differential may be described as the front differential, it will be understood that such is for descriptive convenience and the invention just as readily can and does apply to the rear wheel differential.

Figure 2:
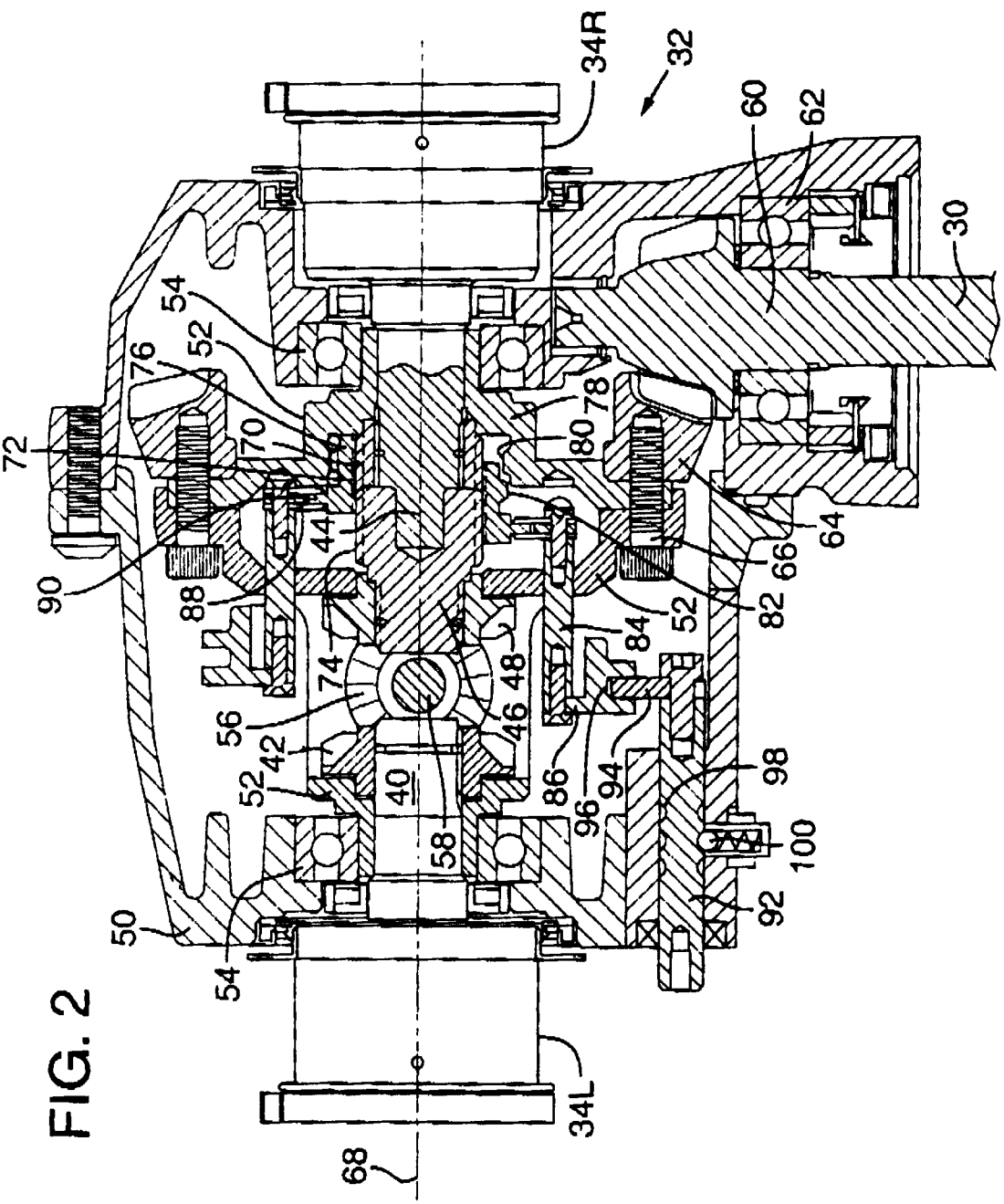
FIG. 2 is a cross sectional view of a differential incorporating the present invention.
Figure 4:
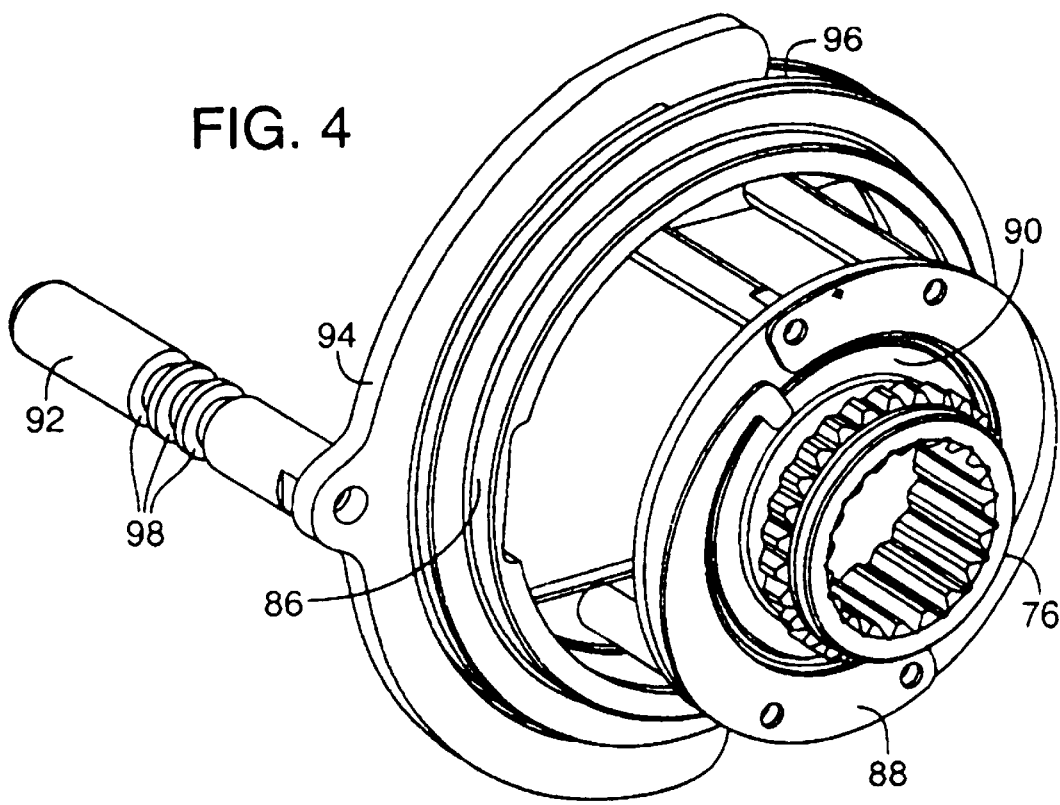
FIG. 4 is a perspective view of a shifting mechanism provided for the differential of FIGS. 2 and 3.
Figure 5:
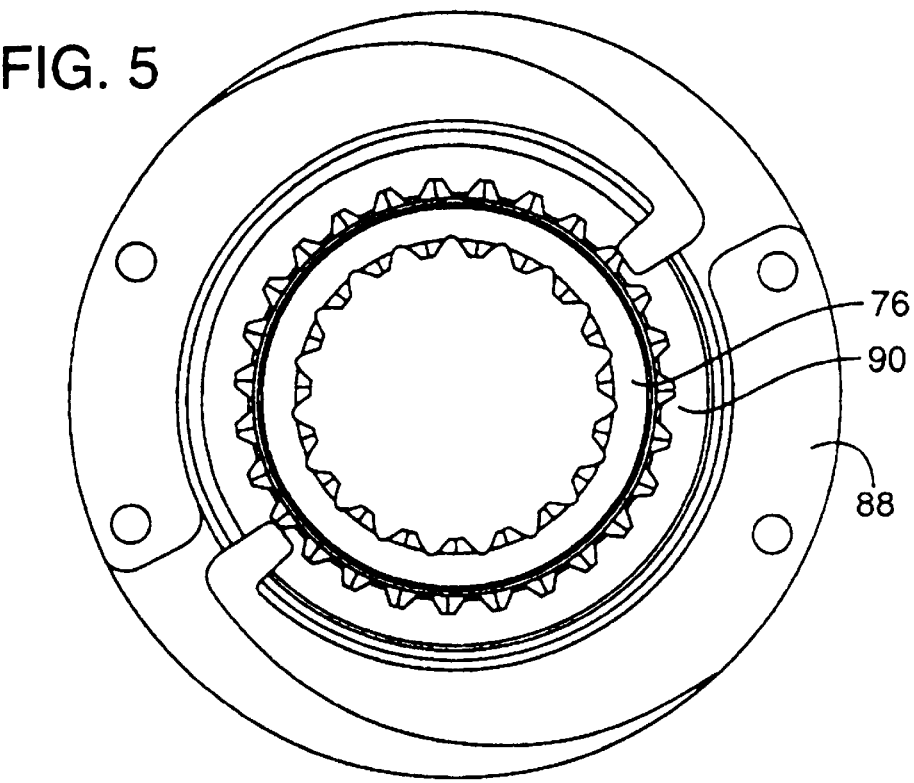
FIG. 5 is a frontal view of certain of the components of the shifting mechanism of FIG. 4.

Reference is now made to FIG. 2 which illustrates front differential 32 including an outer fixed housing referred to as a carrier 50. Connected into the left side of the differential carrier (as illustrated) is left axle 34L and connected into the right side of the differential is right axle 34R. Axle 34L terminates at end 40 which is spline fit to a side gear 42. Axle 34R terminates at end 44 which is interfit with stub axle 46. End 44 is rotatable relative to stub axle 46. Stub axle 46 is spline fit to a second side gear 48 which opposes side gear 42.

Rotatably mounted in the carrier 50 and surrounding the axle ends 40, 44, 46 and side gears 42, 48 is a differential case 52 that rotates relative to the carrier on bearings 54. Mounted to the case are opposed spider or differential gears 56, only one of which is shown in FIG. 2. Spider gears 56 are rotatable relative to case 52 on pivot shaft 58 and they are in splined engagement with opposed side gears 42, 48 connected to axle end 40 and stub axle 46, respectively.

Connected to the differential case 52 is propeller shaft 30 which rotatably drives pinion gear 60 (rotatably mounted in differential carrier 50 by bearing 62). Gear 60 has gear teeth interfit with gear teeth of ring gear 64 which is bolted to differential case 52 by bolts 66. Thus, as propeller shaft 30 is rotatably driven by the engine 14, transmission 18 and transfer case 28, that rotation is transferred to the differential case 52 which rotates about axis 68 (which also the axis of axles 34). As the case 52 is rotated about axis 68, so too is the pivot shaft 58 of gears 56.

In a conventional differential arrangement, the separate stub axle 46 and axle 34R are provided as a single axle that is interfit to gear 48 in a manner similar to axle 34L and gear 42. As the case 52 and the shaft 58 with gears 56 are rotated about axis 68 (by propeller shaft 30), the interfit between gears 56 and gears 42, 48 provides for common rotation of axles 34L and 34R. This assumes that the resistance to the turning of axles 34R and 34L is similar in which case the gears 56 do not rotate around the axis of pivot shaft 58. Should one of the axles 34L, 34R generate a greater resistance to turning than the other, gears 56 rotate about pivot shafts 58 to equalize the torque applied to the two axles and thereby permit differential rotation of the axles.

The above operation of the differential is well known to those skilled in the art and further explanation is not necessary. As explained in the introductory portion, the accommodation of differential turning of axles 34L and 34R is desirable at times, e.g., when turning the vehicle (which requires the outside wheels to turn faster than the inside wheels) and undesirable at other times (when one wheel of the vehicle loses traction due to engagement with ice or mud on the roadway). As also discussed in the introductory portion, with the propeller shaft 30 disconnected from the engine, it is desirable to disconnect the propeller shaft also from the rotating wheels 10 so that the propeller shaft 30 is permitted to not rotate. The multiple modes for the differential including disconnect as between the wheels and propeller shaft; fixed common rotation of the wheels; and permitted differential rotation of the wheels; is provided by the invention as will now be explained.

As explained, axle 34R is rotatable relative to stub axle 46. A coupler 70 is provided on the end 44 of axle 34R. A splined clutch ring 76 engages splines 74 of stub axle 46 and is slidable into an engagement also with splines 72 of coupler 70. With the clutch ring 76 engaging both the stub axle 46 and axle 34R, the stub axle 46 and axle 34R are interlocked. With the clutch ring slid out of engagement with axle 34R, the axle 34R and stub axle 46 are free to rotate independently.

As can be seen from FIG. 2, the juncture of the axle 34R and stub axle 46 is contained within case 52. A flange 78, of the case defines a peripheral wall surrounding coupler 70. The flange 78 is provided with inwardly directed splines 80 that project into the path of the slidable clutch ring 76. Outwardly directed splines 82 on the clutch ring 76 engage spline 80 on flange 78. In a first position, the clutch ring can be slid (to the left in FIG. 2) into engagement with stub axle 46 only. In a second position, it can be slid to the right into engagement also with the splines of the axle 34R. In a third position, it can be slid further to the right into engagement with the splines 80 of case 52 while maintaining engagement with both the stub axle 46 and axle 34R.

The effect of placing the clutch ring in the three positions will be described. With the clutch ring in the center position (engaging both stub axle 46 and axle 34R and not case 52), the differential functions in the conventional manner. If the traction on the two wheels is equal, the propeller shaft drives case 52 which rotates gears 56 about axis 68, and gears 56 through engagement with gears 42, 48 commonly rotate both axles 34L and 34R. When turning the vehicle, because the inside wheel travels slower than the outside wheel, the rotational speed of the axles is unequal and the gears 56 will rotate about the pivot shafts 58 to accommodate the travel difference. Should one of the wheels lose traction (e.g., due to ice on the road), that wheel will spin freely and torque will be greatly reduced to both wheels.

By shifting the clutch ring to the far right position, the splines 82 of the clutch ring 76 engages splines 80 of the case 52. The case 52 and axle 34R (and stub axle 46) all rotate together. Shaft 58 rotates around axis 68 at the same rate as axle 34R and thus the same as gear 48. This prevents turning of gear 56 about its pivot shaft 58 and because gear 42 is engaged with gear 56, axle 34L similarly rotates with case 52 and axle 34R. There can be no relative turning as between the wheels 10 in this mode.

By shifting the clutch ring to the far left, the clutch ring is out of engagement with both axle 34R and case 52 and stub axle 46 rotates freely relative to both axle 34R and case 52. This mode is intended when the propeller shaft 30 is disconnected from the engine at the transfer case and it is desirable to allow the propeller shaft 30 to be passive. However, the wheels will rotate when driven which rotates axles 34L and 34R and if the axles are connected to the propeller shaft 30, the propeller shaft will be driven by the wheels rather than the engine. By disconnecting the axle 34R from the stub axle 46, there is virtually no resistance to turning of gear 48 in either direction of rotation. Now axle 34L (via gear 42) urges rotation of gear 56 about pivot shaft 58 and thus urges reverse rotation of gear 48. Because stub shaft 46 offers no resistance to turning, it freely rotates which avoids forcing the case 52 to turn and allows propeller shaft 30 to thereby remain idle.

Actuation of Clutch Ring

Referring to FIGS. 2–6, it will be appreciated that clutch ring 76 is surrounded by the case 52. Case 52 rotates at a different rate (at least some of the time) than clutch ring 76 and whatever actuation is provided for shifting the clutch ring, it has to accommodate this different rate of rotation. In this preferred embodiment, a plurality of shift posts 84 are protruded through openings in the case 52 and they are secured to a shift ring 86. Shift ring 86 and shift posts 84 rotate with the case 52 but are axially slidable relative to the case 52. Opposite the shift ring at the inner end of the posts 84 are shift springs 88 located on opposed sides of flange 90 of clutch ring 76 (see also FIGS. 4 and 5). Thus, axial movement of shift posts 84 urges axial movement of the clutch ring 76. The springs 88 provide a bearing (similar to a shift fork) that accommodates relative rotation as between the clutch ring and shift posts. The springs 88 also accommodate engagement delay, i.e., should the splines of the clutch ring be misaligned with the splines 72 of the coupler 70 or the splines 80 of the case 52, the springs 88 will flex and provide urging engagement and eventually engagement when the respective splines become aligned. Similarly when disengagement is attempted, the splines may be torque locked and disengagement prevented until release of the lock up. The springs will become loaded and provide disengagement upon release of the lock up.

Movement of the shift ring 86 is provided by shift shaft 92 which protrudes through carrier 50. Carrier 50 doesn't rotate and thus the shift shaft 92 carries shift fork 94 which rides in a groove 96 provided in the periphery of the shift ring 86. The shift fork provides a bearing for accommodating relative rotation of the shift ring 86, i.e., the shift fork slides within the groove 96.

The shift shaft 92 is provided with three positioning grooves 98, one for each of the three positions of the clutch ring and a positioning ball 100 is urged into the respective grooves 98 to resistively permit movement out of the respective positions. In operation, the shift shaft may be moved between the positions (grooves 98), e.g., by a motor to shift the clutch ring. As explained, shifting of the clutch ring via the shift shaft is accomplished by accommodating the rotation of the shift ring via the shift fork 94 and then the relative rotation of the clutch ring via the springs 88.

Those skilled in the art will likely conceive of various modifications and changes to the above preferred embodiment whole still incorporating the invention as determined from the claims appended hereto.

The invention claimed is:

1. A vehicle comprising:
   a differential providing differential rotation as between a pair of front or rear wheels of a vehicle;
   a rotatable differential case including differential gears rotated with said case about an axis of rotation;
   a pair of opposed side gears inter-engaged with said differential gears;
   a ring gear secured to said case and engageable with a vehicle propeller shaft for rotating said ring gear and case;
   a wheel axle extended from one of said side gears carried by said case and a stub axle extended from the other of said side gears carried by said case;
   a second wheel axle adjacent said stub axle and rotatable relative thereto and defining a juncture as between said second wheel axle and said stub axle, and said case configured to have an engagement portion adjacent said juncture and rotatable around said juncture;
   a clutch ring engagingly mounted on one of said stub axle and second wheel axle at a first position adjacent said juncture and movable to a second position into engagement also with the other of said stub axle and second wheel axle, and said clutch ring further movable to a third position into engagement with said engagement portion of said case while retaining engagement with said stub axle and second wheel axle.

2. A vehicle as defined in claim 1 wherein an actuator actuates movement of said clutch ring into a selected position of said first, second and third positions, said actuator including:
   a shift member that protrudes through said case and rotates with said case and is axially movable relative to said case, a carrier surrounding said case and not rotatable, a shift shaft protruding through the carrier and mounted for linear shifting of said shift shaft;
   a first coupler coupling said shift shaft to said shift member and a second coupler coupling said shift member to said clutch ring for imparting linear movement to said clutch ring, said first and second couplers having rotatable bearings to permit relative rotative movement as between said shift shaft and said shift member and as between said shift member and said clutch ring.

3. A vehicle as defined in claim 2 wherein said stub axle, second wheel axle, ring-shaped engagement portion and clutch ring include splines that cooperatively mate for linear sliding engagement and disengagement by the clutch ring, and wherein one of said couplers includes a compliant portion that permits delayed movement of the clutch ring when movement toward engagement is resisted pending alignment of the splines and when movement toward disengagement is resisted pending release of a torque lock up.

4. A vehicle as defined in claim 3 wherein pre-loaded spring fingers project from said shift member and engage said clutch ring to provide said compliant portion to said second coupler.

5. A vehicle as defined in claim 1 wherein said case surrounds said juncture, a shift member protruded through said case and rotatable with said case and axially movable relative to said case, a bearing type coupler coupling the shift member to the clutch ring for axial positioning of said clutch ring.

* * * * *